(12) United States Patent
Nan et al.

(10) Patent No.: US 9,726,931 B2
(45) Date of Patent: Aug. 8, 2017

(54) LIQUID CRYSTAL DISPLAY PANEL, METHOD FOR MANUFACTURING THE SAME, AND LIQUID CRYSTAL DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Yingying Nan, Beijing (CN); Shan Gao, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 141 days.

(21) Appl. No.: 14/432,448

(22) PCT Filed: Mar. 20, 2014

(86) PCT No.: PCT/CN2014/073783
§ 371 (c)(1),
(2) Date: Mar. 30, 2015

(87) PCT Pub. No.: WO2015/131418
PCT Pub. Date: Sep. 11, 2015

(65) Prior Publication Data
US 2016/0246120 A1      Aug. 25, 2016

(30) Foreign Application Priority Data

Mar. 6, 2014   (CN) .................... 2014 2 0100386 U

(51) Int. Cl.
G02F 1/1335    (2006.01)
G02F 1/1343    (2006.01)
G02B 5/22      (2006.01)

(52) U.S. Cl.
CPC .. G02F 1/133615 (2013.01); G02F 1/133512 (2013.01); G02F 1/134336 (2013.01); *G02B 5/22* (2013.01)

(58) Field of Classification Search
CPC ......... G02F 1/133615; G02F 1/133512; G02F 1/134336; G02F 1/133514; G02B 5/22; G02B 5/223
(Continued)

(56) References Cited

U.S. PATENT DOCUMENTS

2006/0012733 A1    1/2006  Jin et al.

FOREIGN PATENT DOCUMENTS

| CN | 101846859 A | 9/2010 |
| CN | 202649645 U | 1/2013 |
| JP | 2013015680 A | 1/2013 |

OTHER PUBLICATIONS

English translation of of Japanese Patent Publication No. JP 2013015680 (original also included); downloaded from https://www.j-platpat.inpit.go.jp/web/all/top/BTmTopEnglishPage on Oct. 11, 2016.*

(Continued)

*Primary Examiner* — Angela Davison
(74) *Attorney, Agent, or Firm* — Harness, Dickey & Pierce, P.L.C.

(57) ABSTRACT

The present disclosure relates to the field of display technology, and provides a liquid crystal display panel, a method for manufacturing the same and a liquid crystal display device. The liquid crystal display panel includes a screen body including a plurality of pixel units arranged in an array
(Continued)

form, and a plurality of light sources arranged at a peripheral region of the screen body so as to provide back light to the pixel units. An aperture ratio of the pixel unit increases along with an increase in a distance between the pixel unit and the light source arranged at the peripheral region.

15 Claims, 5 Drawing Sheets

(58) Field of Classification Search
USPC .................... 349/61, 65, 110, 106; 313/110; 362/97.1–97.3, 600
See application file for complete search history.

(56) References Cited

OTHER PUBLICATIONS

English portions only, International Search Report and Written Opinion mailed Dec. 5, 2014 regarding PCT/CN2014/073783. Translation provided by Dragon Intellectual Property Law Firm.

* cited by examiner

LIQUID CRYSTAL DISPLAY PANEL, METHOD FOR MANUFACTURING THE SAME, AND LIQUID CRYSTAL DISPLAY DEVICE

CROSS-REFERENCE TO RELATED APPLICATION

This application is the U.S. national phase of PCT Application No. PCT/CN2014/073783 filed on Mar. 20, 2014, which claims a priority of the Chinese patent application No. 201420100386.9 filed on Mar. 6, 2014, both of which are incorporated herein by reference in their entirety.

TECHNICAL FIELD

The present disclosure relates to the field of display technology, in particular to a liquid crystal display panel, a method for manufacturing the same and a liquid crystal display device.

BACKGROUND

Along with the progress of society and the development of science and technology, the human beings have, especially in the 21$^{st}$ century, come into the information times, and information has become a very important resource nowadays, which results in a grand transformation in our production modes, lifestyles, working modes and learning styles. Display device has become an indispensable tool for information transmission. Especially along with the rapid development of a light-emitting diode (LED) technique in the recent years, a LED display device has become a mainstream of the display devices. With the occurrence of surface mount device (SMD) LEDs in 2001, more and more LED display screens have been used in such fields as city square display, instructions and illuminations, and light-box advertisements. Due to its features such as various colors and high brightness, the LED display screen can provide a more attractive display effect, and thus has gradually become a focus of most concern.

Currently, a nontransparent display screen is available in the market. In order to meet the market demand, it is required to develop new display modes and improve the display effect of the display screen. More and more manufacturers have devoted themselves to the development of a transparent display product. As a thin, light, fashionable and portable product, the transparent display screen can also support 3D display and save energy. In addition, as its maximum advantage, the transparent display screen may provide a user with a novel human-machine interaction experience because the user can "catch" items displayed on the screen.

As shown in FIG. 1, the transparent display screen includes a screen body 10, and a plurality of LEDs 4 arranged around the screen body 10. These LEDs 4 serve as light sources for the screen body 10, so as to enable the transparent display screen to display an image.

However, in the related art, the LEDs 4 are arranged around the screen body 10, so a peripheral region of the screen body 10 adjacent to the LEDs 4 has high display brightness, while a central region of the screen body 10 away from the LEDs 4 has low display brightness, as shown in FIG. 2. As a result, the display brightness of the display screen gradually decreases from the periphery to the center, i.e., the screen is of poor brightness evenness, and the display effect is not ideal.

SUMMARY

An object of the present disclosure is to provide a liquid crystal display panel, a method for manufacturing the same, and a liquid crystal display device, so as to improve brightness evenness of a screen and enhance a display effect.

In one aspect, the present disclosure provides in one embodiment a liquid crystal display panel, including:
a screen body including a plurality of pixel units arranged in an array form; and
a plurality of light sources arranged at a peripheral region of the screen body so as to provide back light to the pixel units,
wherein an aperture ratio of the pixel unit increases along with an increase in a distance between the pixel unit and the light source arranged at the peripheral region.

In another aspect, the present disclosure provides in one embodiment a method for manufacturing a liquid crystal display panel, including:
providing a screen body including a plurality of pixel units arranged in an array form; and
providing a plurality of light sources at a peripheral region of the screen body so as to provide back light to the pixel units,
wherein an aperture ratio of the pixel unit increases along with an increase in a distance between the pixel unit and the light source arranged at the peripheral region.

In the embodiments of the present disclosure, the aperture ratio of the pixel unit increases along with an increase in a distance between the pixel unit and the light source arranged at the peripheral region, so that the light passing through the pixel units is of the equivalent brightness. In this way, the pixel units have the same transmittance, and the brightness evenness of the display panel is improved. As a result, it is able to remarkably enhance the display effect of the liquid crystal display panel.

Alternatively, a width of a black matrix corresponding to the pixel unit decreases along with an increase in a distance between the pixel unit and the light source at the peripheral region, so that the light passing through the pixel units is of the equivalent brightness.

According to the present disclosure, the aperture ratio of the pixel unit is changed by adjusting the width of the black matrix corresponding to the pixel unit. As a result, the design is simple and the process is feasible, without any additional production cost.

Alternatively, the plurality of light sources are arranged evenly at one side, two opposite sides, or four sides of the screen body.

The plurality of light sources may be arranged at one side of the screen body, or at two sides opposite to each other, or at its four sides. In addition, the light sources are arranged evenly, so as to facilitate the assembling and to improve the display brightness evenness of the screen.

The light source includes an LED or a cold cathode fluorescent lamp (CCFL). Typically, the LED is adopted due to its features such as high brightness, low power consumption and long service life as well as diversified layout designs.

Alternatively, when the light from the plurality of light sources to the pixel unit is of a brightness value of 991 cd/m$^2$ to 1009 cd/m$^2$, the aperture ratio of the pixel unit is 56.5% to 57.5%; when the light from the plurality of light sources to the pixel unit is of a brightness value of 942 cd/m$^2$ to 958 cd/m$^2$, the aperture ratio of the pixel unit is 59.5% to 60.5%; and when the light from the plurality of light sources to the pixel unit is of a brightness value of 892 cd/m² to 906 cd/m², the aperture ratio of the pixel unit is 62.9% to 63.9%.

Alternatively, when the aperture ratio of the pixel unit is 56.5% to 57.5%, the width of the black matrix corresponding to the pixel unit is 34.7 μm to 35.3 μm; when the aperture ratio of the pixel unit is 59.5% to 60.5%, the width of the black matrix corresponding to the pixel unit is 32.7 μm to 33.3 μm; and when the aperture ratio of the pixel unit is 62.9% to 63.9%, the width of the black matrix corresponding to the pixel unit is 30.7 μm to 31.3 μm.

In yet another aspect, the present disclosure provides in one embodiment a liquid crystal display device including the above-mentioned liquid crystal display panel. According to the liquid crystal display device of the present disclosure, it is able to improve the brightness evenness and enhance the display effect.

REFERENCE NUMBER 1a, 1b and 1c pixel unit
2 light source
3a, 3b, 3c black matrix
4 LED
10 screen body

DETAILED DESCRIPTION

In order to improve brightness evenness of a screen and enhance a display effect, the present disclosure provides in the following embodiments a liquid crystal display panel, a method for manufacturing the same and a liquid crystal display device. According to the embodiments of the present disclosure, an aperture ratio of a pixel unit increases along with an increase in a distance between the pixel unit and a light source arranged at a peripheral region, so that the light passing through the pixel units is of the equivalent brightness. In this way, the pixel units have the same transmittance, and the brightness evenness of the display panel is improved. As a result, it is able to remarkably enhance the display effect of the liquid crystal display panel.

In order to make the objects, the technical solutions and the advantages of the present disclosure more apparent, the present disclosure will be described hereinafter in conjunction with the drawings and embodiments.

Figure 1:
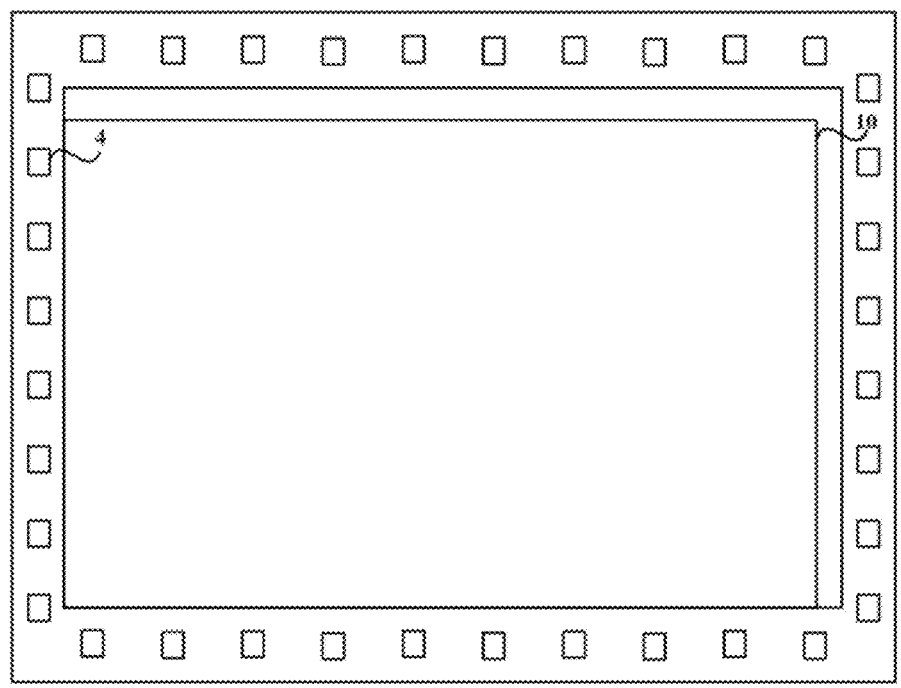
FIG. 1 is a top view of an existing liquid crystal display panel.
Figure 2:
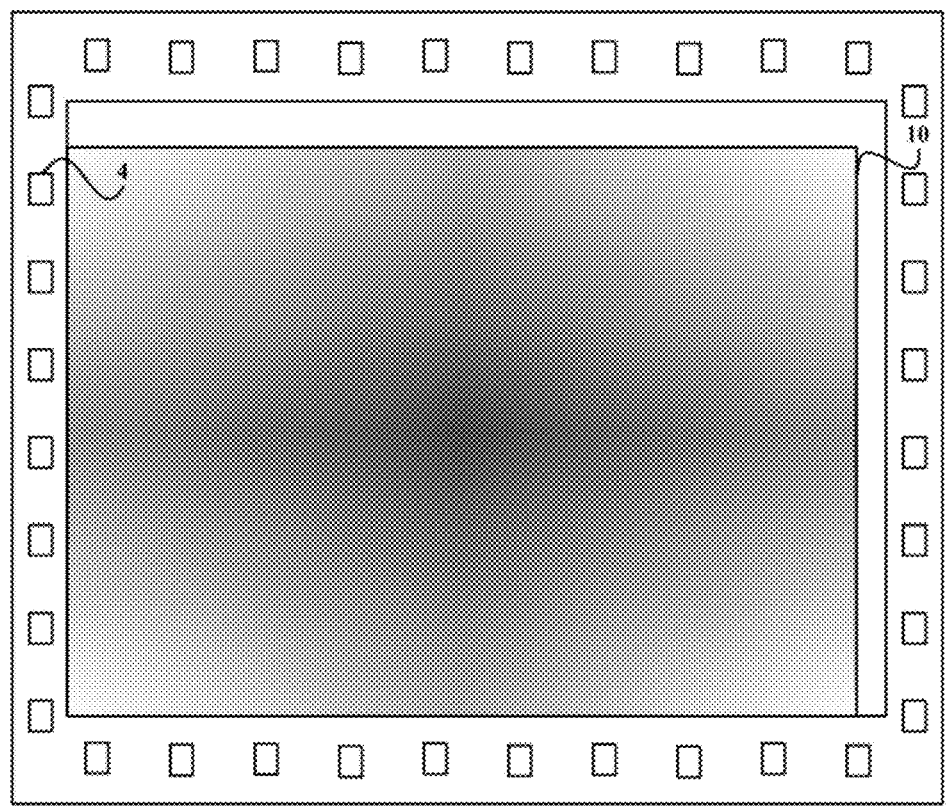
FIG. 2 is a schematic view showing a display brightness effect of an existing transparent display screen.
Figure 3:
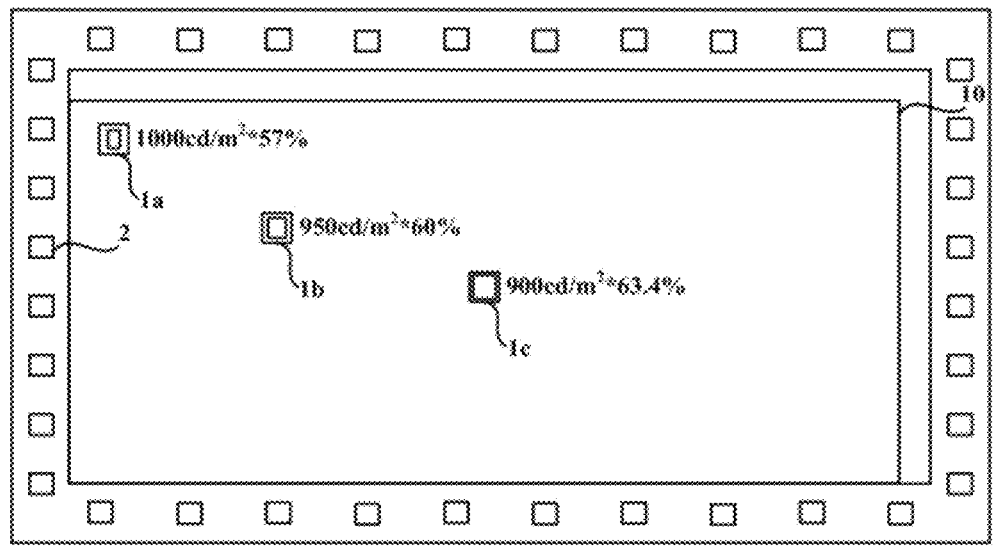
FIG. 3 is a top view of a liquid crystal display panel according to the first embodiment of the present disclosure.

As shown in FIG. 3, a liquid crystal display panel in one embodiment of the present disclosure includes a screen body 10 including a plurality of pixel units (merely pixel units 1a, 1b, and 1c are shown in FIG. 3) arranged in an array form, and a plurality of light sources 2 arranged at a peripheral region of the screen body 10 so as to provide back light to the pixel units. An aperture ratio of the pixel unit increases along with an increase in a distance between the pixel unit and the light sources 2 arranged at the peripheral region, so that light passing through the pixel units may be of the equivalent brightness.

Figure 5:
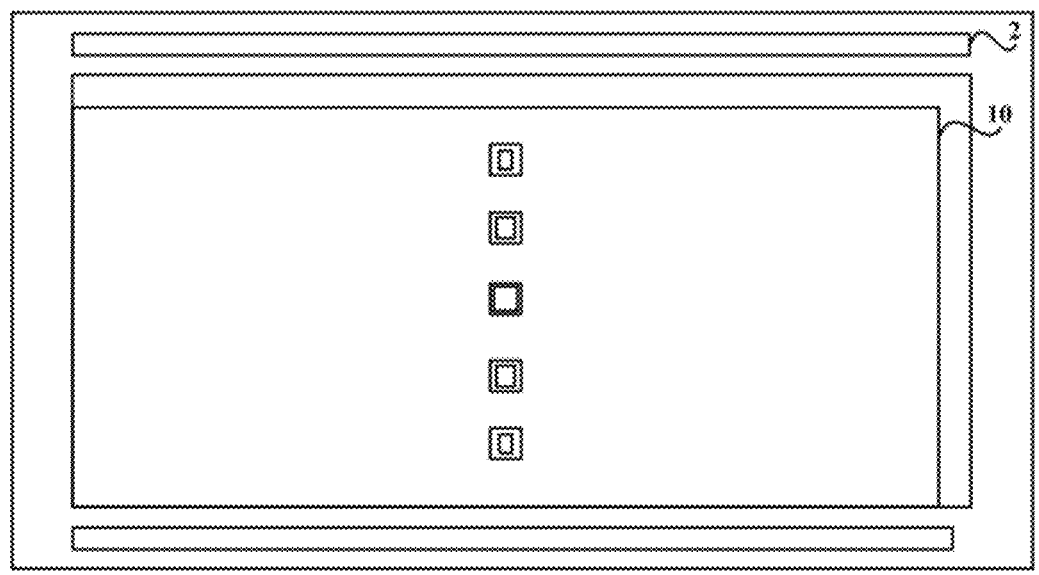
FIG. 5 is a top view of the liquid crystal display panel according to the third embodiment of the present disclosure.

The type of the light source 2 is not particularly defined herein. For example, it may be an LED (as shown in FIG. 3), or a CCFL (as shown in FIG. 5). Typically, the LED is adopted due to its features such as high brightness, low power consumption and long service life as well as diversified layout designs.

The aperture ratio of a pixel unit refers to a ratio of an area of a region of a pixel through which the light can pass to a total area of the pixel, and it is a primary factor that determines the transmittance of the pixel unit. When the light sources are evenly arranged at four sides of the screen body, the brightness of the light sources corresponding to the pixel units gradually decreases from a periphery to a center, and when the light sources are evenly arranged at two opposite sides of the screen body, the brightness of the light sources corresponding to the pixel units gradually decreases from the two opposite sides to a central line.

Figure 4:
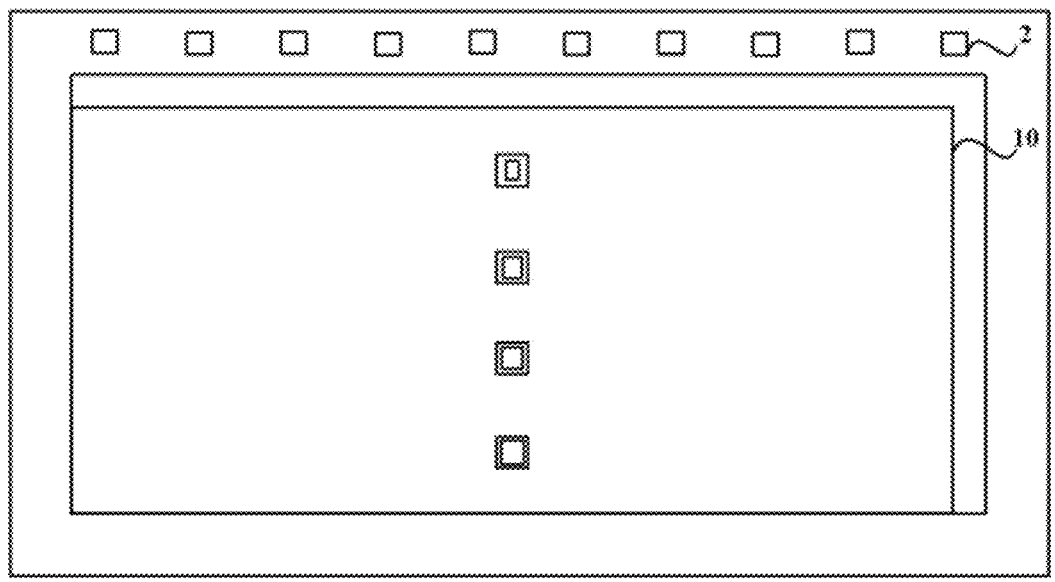
FIG. 4 is a top view of the liquid crystal display panel according to the second embodiment of the present disclosure.

The plurality of light sources 2 may be evenly arranged at one side, or at two opposite sides, or at four sides, of the screen body 10. The plurality of light sources 2 may be arranged at one side of the screen body (as shown in FIG. 4), or at two sides opposite to each other (see FIG. 5), or at its four sides (as shown in FIG. 3). In addition, the light sources are arranged evenly, so as to facilitate the assembling and to improve the display brightness evenness of the screen. In the embodiment as shown in FIG. 3, the light sources 2 are LEDs, which are arranged evenly at the four sides of the screen body 10.

The aperture ratio of the pixel unit may be adjusted in various modes. In one embodiment of the present disclosure, a width of a black matrix corresponding to the pixel unit decreases along with an increase in a distance between the pixel unit and the light source at the peripheral region, so that the light passing through the pixel units is of the equivalent brightness. By adjusting the width of the black matrix corresponding to the pixel unit, it is able to change the aperture ratio of the pixel unit, so as to provide a simple design and a feasible process, without any additional production cost For example, when the light from the plurality of light sources to the pixel unit is of a brightness value of 991 cd/m² to 1009 cd/m², the aperture ratio of the pixel unit is 56.5% to 57.5%; when the light from the plurality of light sources to the pixel unit is of a brightness value of 942 cd/m² to 958 cd/m², the aperture ratio of the pixel unit is 59.5% to 60.5%; and when the light from the plurality of light sources to the pixel unit is of a brightness value of 892 cd/m² to 906 cd/m², the aperture ratio of the pixel unit is 62.9% to 63.9%.

As shown in FIG. 3, the light from the light sources 2 to the pixel unit 1a is of a brightness value of 1000 cd/m² and the aperture ratio of the corresponding pixel unit 1a is 57%; the light from the light sources 2 to the pixel unit 1b is of a brightness value of 950 cd/m² and the aperture ratio of the corresponding pixel unit 1b is 60%; and the light from the light sources 2 to the pixel unit 1c is of a brightness value of 900 cd/m² and the aperture ratio of the corresponding pixel unit 1c is 63.4%. it can be seen that, 1000 cd/m²*57%=950 cd/m²*60%=900 cd/m²*63.4%, i.e., the pixel units 1a, 1b and 1c substantively have the same transmittance. As a result, it is able to improve the display brightness evenness of the display screen and enhance the display effect thereof.

The aperture ratio of the pixel unit is changed by adjusting the width of the black matrix corresponding to the pixel unit. The larger the aperture ratio is, the smaller the width of the black matrix is. For example, when the aperture ratio of the pixel unit is 56.5% to 57.5%, the width of the black matrix corresponding to the pixel unit is 34.7 μm to 35.3 μm; when the aperture ratio of the pixel unit is 59.5% to 60.5%, the width of the black matrix corresponding to the pixel unit is 32.7 μm to 33.3 μm; and when the aperture ratio of the pixel unit is 62.9% to 63.9%, the width of the black matrix corresponding to the pixel unit is 30.7 μm to 31.3 μm.

Figure 6:
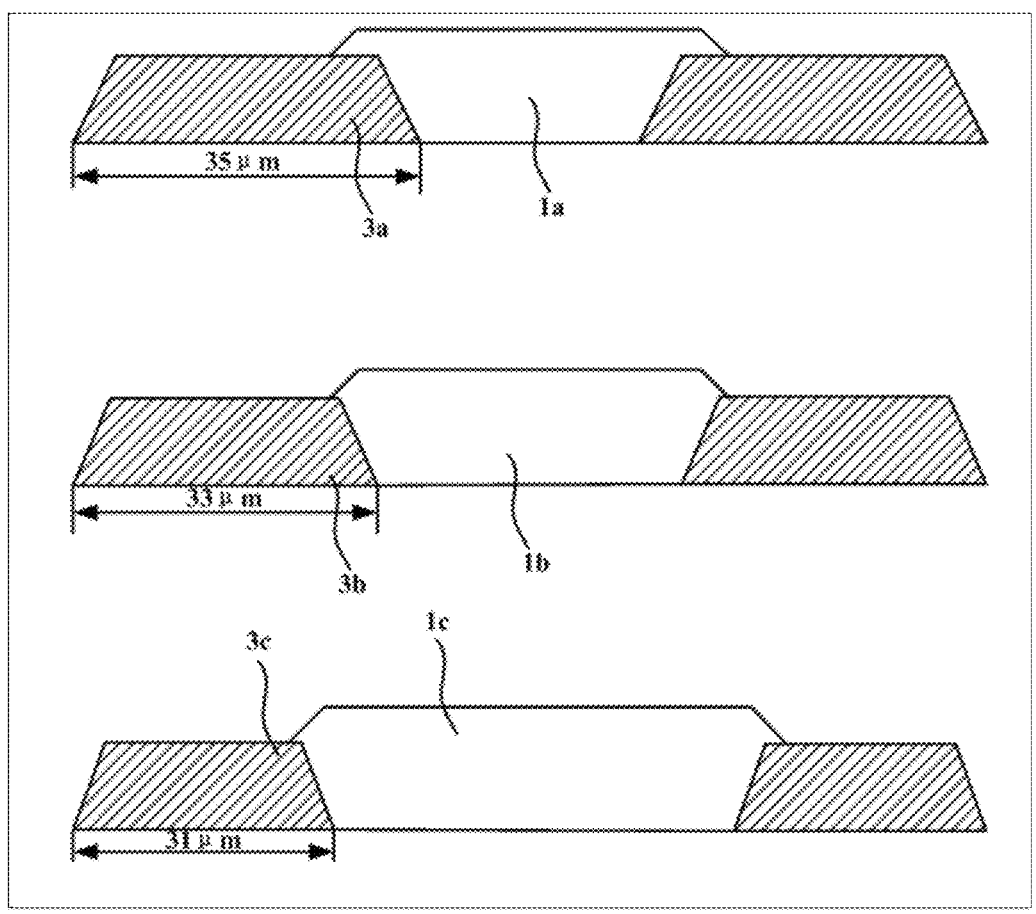
FIG. 6 is a sectional view of a pixel unit 1a, a pixel unit 1b and a pixel unit 1c in FIG. 3.

As shown in FIG. 6, when the aperture ratio of the pixel unit $1a$ is 57%, a width of a black matrix $3a$ corresponding to the pixel unit $1a$ is 35 μm; when the aperture ratio of the pixel unit $1b$ is 60%, a width of a black matrix $3b$ corresponding to the pixel unit $1b$ is 33 μm; and when the aperture ratio of the pixel unit $1c$ is 63%, a width of a black matrix $3c$ corresponding to the pixel unit $1c$ is 31 μm.

The brightness of the light from the light sources to the pixel unit is associated with the brightness of the light sources themselves, the distances between the light sources and the pixel unit and the density of the light sources, and it may be set in accordance with the practical need.

According to the embodiments of the present disclosure, the aperture ratio of the pixel unit increases along with an increase in the distance between the pixel unit and the light sources at the peripheral region, so that the light passing through the pixel units is of the equivalent brightness. In this way, the pixel units have the same transmittance, and the brightness evenness of the display panel is improved. As a result, it is able to remarkably enhance the display effect of the liquid crystal display panel.

The above-mentioned liquid crystal display panel may include various display panels, e.g., a liquid crystal display panel with a transparent display mode or a non-transparent display mode may be used. In the embodiments of the present disclosure, the light sources which serve as the back light sources are arranged at the periphery of the screen body, so it is more suitable for the manufacture of the display panel with the transparent display mode.

The present disclosure further provides in one embodiment a liquid crystal display device including the above-mentioned liquid crystal display panel. According to the liquid crystal display device of the present disclosure, it is able to improve the brightness evenness and enhance the display effect. In this embodiment, the liquid crystal display device may be any product or member having a display function, such as a liquid crystal panel, a liquid crystal TV, a liquid crystal display, a digital photo frame, a mobile phone and a flat-panel PC.

The above are merely the optional embodiments of the present disclosure. Obviously, a person skilled in the art may make further modifications and improvements without departing from the spirit and scope of the present disclosure, and if these modifications and improvements fall within the scope of the appended claims and the equivalents thereof, the present disclosure also intends to include them.

What is claimed is:

1. A liquid crystal display panel, comprising:
    a screen body including a plurality of pixel units arranged in an array form; and
    a plurality of light sources arranged at a peripheral region of the screen body so as to provide back light to the pixel units,
    wherein an aperture ratio of the pixel unit increases along with an increase in a distance between the pixel unit and the light source arranged at the peripheral region,
    when the light from the plurality of light sources to the pixel unit is of a brightness value of 991 $cd/m^2$ to 1009 $cd/m^2$, the aperture ratio of the pixel unit is 56.5% to 57.5%;
    when the light from the plurality of light sources to the pixel unit is of a brightness value of 942 $cd/m^2$ to 958 $cd/m^2$, the aperture ratio of the pixel unit is 59.5% to 60.5%; and
    when the light from the plurality of light sources to the pixel unit is of a brightness value of 892 $cd/m^2$ to 906 $cd/m^2$, the aperture ratio of the pixel unit is 62.9% to 63.9%.

2. The liquid crystal display panel according to claim 1, wherein a width of a black matrix corresponding to the pixel unit decreases along with an increase in a distance between the pixel unit and the light source at the peripheral region.

3. The liquid crystal display panel according to claim 1, wherein the plurality of light sources are arranged evenly at one side, two opposite sides, or four sides of the screen body.

4. The liquid crystal display panel according to claim 1, wherein the light source comprises a light-emitting diode or a cold cathode fluorescent lamp.

5. The liquid crystal display panel according to claim 1, wherein
    when the aperture ratio of the pixel unit is 56.5% to 57.5%, a width of a black matrix corresponding to the pixel unit is 34.7 μm to 35.3 μm;
    when the aperture ratio of the pixel unit is 59.5% to 60.5%, the width of the black matrix corresponding to the pixel unit is 32.7 μm to 33.3 μm; and
    when the aperture ratio of the pixel unit is 62.9% to 63.9%, the width of the black matrix corresponding to the pixel unit is 30.7 μm to 31.3 μm.

6. A liquid crystal display device comprising a liquid crystal display panel, wherein the liquid crystal display panel comprises:
    a screen body including a plurality of pixel units arranged in an array form; and
    a plurality of light sources arranged at a peripheral region of the screen body so as to provide back light to the pixel units,
    wherein an aperture ratio of the pixel unit increases along with an increase in a distance between the pixel unit and the light source arranged at the peripheral region,
    when the light from the plurality of light sources to the pixel unit is of a brightness value of 991 $cd/m^2$ to 1009 $cd/m^2$, the aperture ratio of the pixel unit is 56.5% to 57.5%;
    when the light from the plurality of light sources to the pixel unit is of a brightness value of 942 $cd/m^2$ to 958 $cd/m^2$, the aperture ratio of the pixel unit is 59.5% to 60.5%; and
    when the light from the plurality of light sources to the pixel unit is of a brightness value of 892 $cd/m^2$ to 906 $cd/m^2$, the aperture ratio of the pixel unit is 62.9% to 63.9%.

7. The liquid crystal display device according to claim 6, wherein a width of a black matrix corresponding to the pixel unit decreases along with an increase in a distance between the pixel unit and the light source at the peripheral region.

8. The liquid crystal display device according to claim 6, wherein the plurality of light sources are arranged evenly at one side, two opposite sides, or four sides of the screen body.

9. The liquid crystal display device according to claim 6, wherein the light source comprises a light-emitting diode or a cold cathode fluorescent lamp.

10. The liquid crystal display device according to claim 6, wherein
- when the aperture ratio of the pixel unit is 56.5% to 57.5%, a width of a black matrix corresponding to the pixel unit is 34.7 μm to 35.3 μm;
- when the aperture ratio of the pixel unit is 59.5% to 60.5%, the width of the black matrix corresponding to the pixel unit is 32.7 μm to 33.3 μm; and
- when the aperture ratio of the pixel unit is 62.9% to 63.9%, the width of the black matrix corresponding to the pixel unit is 30.7 μm to 31.3 μm.

11. A method for manufacturing a liquid crystal display panel, comprising:
- providing a screen body including a plurality of pixel units arranged in an array form; and
- providing a plurality of light sources at a peripheral region of the screen body so as to provide back light to the pixel units,
- wherein an aperture ratio of the pixel unit increases along with an increase in a distance between the pixel unit and the light source arranged at the peripheral region,
- when the light from the plurality of light sources to the pixel unit is of a brightness value of 991 cd/m$^2$ to 1009 cd/m$^2$, the aperture ratio of the pixel unit is 56.5% to 57.5%;
- when the light from the plurality of light sources to the pixel unit is of a brightness value of 942 cd/m$^2$ to 958 cd/m$^2$, the aperture ratio of the pixel unit is 59.5% to 60.5%; and
- when the light from the plurality of light sources to the pixel unit is of a brightness value of 892 cd/m$^2$ to 906 cd/m$^2$, the aperture ratio of the pixel unit is 62.9% to 63.9%.

12. The method according to claim 11, further comprising:
- enabling a width of a black matrix corresponding to the pixel unit to decrease along with an increase in a distance between the pixel unit and the light source at the peripheral region.

13. The method according to claim 11, wherein the plurality of light sources are arranged evenly at one side, two opposite sides, or four sides of the screen body.

14. The method according to claim 11, wherein the light source comprises a light-emitting diode or a cold cathode fluorescent lamp.

15. The method according to claim 11, wherein
- when the aperture ratio of the pixel unit is 56.5% to 57.5%, a width of a black matrix corresponding to the pixel unit is 34.7 μm to 35.3 μm;
- when the aperture ratio of the pixel unit is 59.5% to 60.5%, the width of the black matrix corresponding to the pixel unit is 32.7 μm to 33.3 μm; and
- when the aperture ratio of the pixel unit is 62.9% to 63.9%, the width of the black matrix corresponding to the pixel unit is 30.7 μm to 31.3 μm.

* * * * *